(12) United States Patent
Tsai et al.

(10) Patent No.: US 11,206,563 B2
(45) Date of Patent: Dec. 21, 2021

(54) APPARATUSES AND METHODS FOR EXTENDING USE OF SFN (SYSTEM FRAME NUMBER) AND FRAME TIMING DIFFERENCE (SFTD) MEASUREMENTS

(71) Applicant: MEDIATEK INC., Hsinchu (TW)

(72) Inventors: Chun-Fan Tsai, Hsinchu (TW); Li-Chuan Tseng, Hsinchu (TW); Tsang-Wei Yu, Hsinchu (TW); Yuanyuan Zhang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 227 days.

(21) Appl. No.: 16/242,249

(22) Filed: Jan. 8, 2019

(65) Prior Publication Data

US 2019/0215711 A1    Jul. 11, 2019

Related U.S. Application Data

(60) Provisional application No. 62/615,553, filed on Jan. 10, 2018.

(51) Int. Cl.
| | |
|---|---|
| *H04W 24/10* | (2009.01) |
| *H04W 56/00* | (2009.01) |
| *H04W 36/00* | (2009.01) |
| *H04W 72/04* | (2009.01) |
| *H04B 17/309* | (2015.01) |
| *H04W 76/27* | (2018.01) |

(52) U.S. Cl.
CPC .......... *H04W 24/10* (2013.01); *H04B 17/309* (2015.01); *H04W 36/00835* (2018.08); *H04W 56/0045* (2013.01); *H04W 72/0446* (2013.01); *H04W 76/27* (2018.02); *H04W 36/0085* (2018.08)

(58) Field of Classification Search
None
See application file for complete search history.

(56) References Cited

U.S. PATENT DOCUMENTS

| 9,749,098 B2 | 8/2017 | Baek et al. | |
| 2014/0073331 A1* | 3/2014 | Lee | H04W 72/048 |
| | | | 455/444 |

(Continued)

FOREIGN PATENT DOCUMENTS

| CN | 105659663 A | 6/2016 | |
| CN | 106797579 A | 5/2017 | |
| WO | WO-2017052464 A1 * | 3/2017 | ............ H04W 24/10 |

*Primary Examiner* — Zewdu A Beyen
(74) *Attorney, Agent, or Firm* — Oblon, McClelland, Maier & Neustadt, L.L.P.

(57) ABSTRACT

A User Equipment (UE) including a wireless transceiver and a controller is provided. The wireless transceiver performs wireless transmission and reception to and from a first service network and a second service network. The controller receives a Radio Resource Control (RRC) message comprising a measurement configuration for SFN (System Frame Number) and Frame Timing Difference (SFTD) from the first service network via the wireless transceiver, performs first SFTD measurements between a Primary Cell (PCell) of the first service network and neighbor cells of the second service network via the wireless transceiver in response to the measurement configuration for SFTD indicating the neighbor cells, and sends a result of the first SFTD measurements to the first service network via the wireless transceiver.

15 Claims, 3 Drawing Sheets

(56) References Cited

U.S. PATENT DOCUMENTS

2017/0201917 A1   7/2017  Han et al.
2017/0257788 A1*  9/2017  Takahashi ......... H04W 56/0015
2018/0249463 A1*  8/2018  Huang ................ H04W 76/28

* cited by examiner

APPARATUSES AND METHODS FOR EXTENDING USE OF SFN (SYSTEM FRAME NUMBER) AND FRAME TIMING DIFFERENCE (SFTD) MEASUREMENTS

CROSS REFERENCE TO RELATED APPLICATIONS

This Application claims priority of U.S. Provisional Application No. 62/615,553, filed on Jan. 10, 2018, the entirety of which is incorporated by reference herein.

BACKGROUND OF THE APPLICATION

Field of the Application

The application generally relates to wireless communications and, more particularly, to apparatuses and methods for extending use of SFN (System Frame Number) and Frame Timing Difference (SFTD) measurements.

Description of the Related Art

With the growing demand for ubiquitous computing and networking, various cellular technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

These cellular technologies have been adopted in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, improving services, and making use of a new spectrum, and to better integrate with other open standards, as well as to support beamforming, Multiple-Input Multiple-Output (MIMO) antenna technology, and Carrier Aggregation (CA).

Typically, a User Equipment (UE) needs to periodically measure certain attributes, e.g., the received signal quality, of the serving cell(s) and neighbor cells, and to report the measurement results to the service network for potential handover or cell reselection. There are various types of measurements, including intra-frequency measurements, inter-frequency measurements, inter-Radio Access Technology (RAT) measurements, Channel Busy Ratio (CBR) measurements, SFN (System Frame Number) and Subframe Timing Difference (SSTD) measurements, and SFN and Frame Timing Difference (SFTD) measurements, etc.

BRIEF SUMMARY OF THE APPLICATION

Conventionally, SFTD measurements are supported only in the scenario called Evolved-Universal Terrestrial Radio Access (E-UTRA)-NR Dual Connectivity (EN-DC), in which the UE has dual connectivity with a 5G NR network and an LTE network simultaneously. In case of SFTD measurements, the UE is required to measure the timing difference between the Primary Cell (PCell) of the LTE network and specifically the Primary Secondary Cell (PS-Cell) of the 5G NR network.

The present application aims to extend the use of SFTD measurements to the NR cell(s) that has/have not been configured as PSCell, and further proposes to configure the SFTD measurements for NR cell(s) via Radio Resource Control (RRC) signaling.

In one aspect of the application, a UE comprising a wireless transceiver and a controller is provided. The wireless transceiver is configured to perform wireless transmission and reception to and from a first service network and a second service network. The controller is configured to receive a RRC message comprising a measurement configuration for SFTD from the first service network via the wireless transceiver, perform one or more first SFTD measurements between a PCell of the first service network and one or more neighbor cells of the second service network via the wireless transceiver in response to the measurement configuration for SFTD indicating the neighbor cells, and send a result of the first SFTD measurements to the first service network via the wireless transceiver.

In another aspect of the application, a method for extending use of SFTD measurements, executed by a UE connected to a first service network and a second service network, is provided. The method comprises the steps of: receiving an RRC message comprising a measurement configuration for SFTD from the first service network; performing one or more first SFTD measurements between a PCell of the first service network and one or more neighbor cells of the second service network in response to the measurement configuration for SFTD indicating the neighbor cells; and sending a result of the first SFTD measurements to the first service network.

Other aspects and features of the present application will become apparent to those with ordinarily skill in the art upon review of the following descriptions of specific embodiments of the UEs and the methods for extending use of SFTD measurements.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
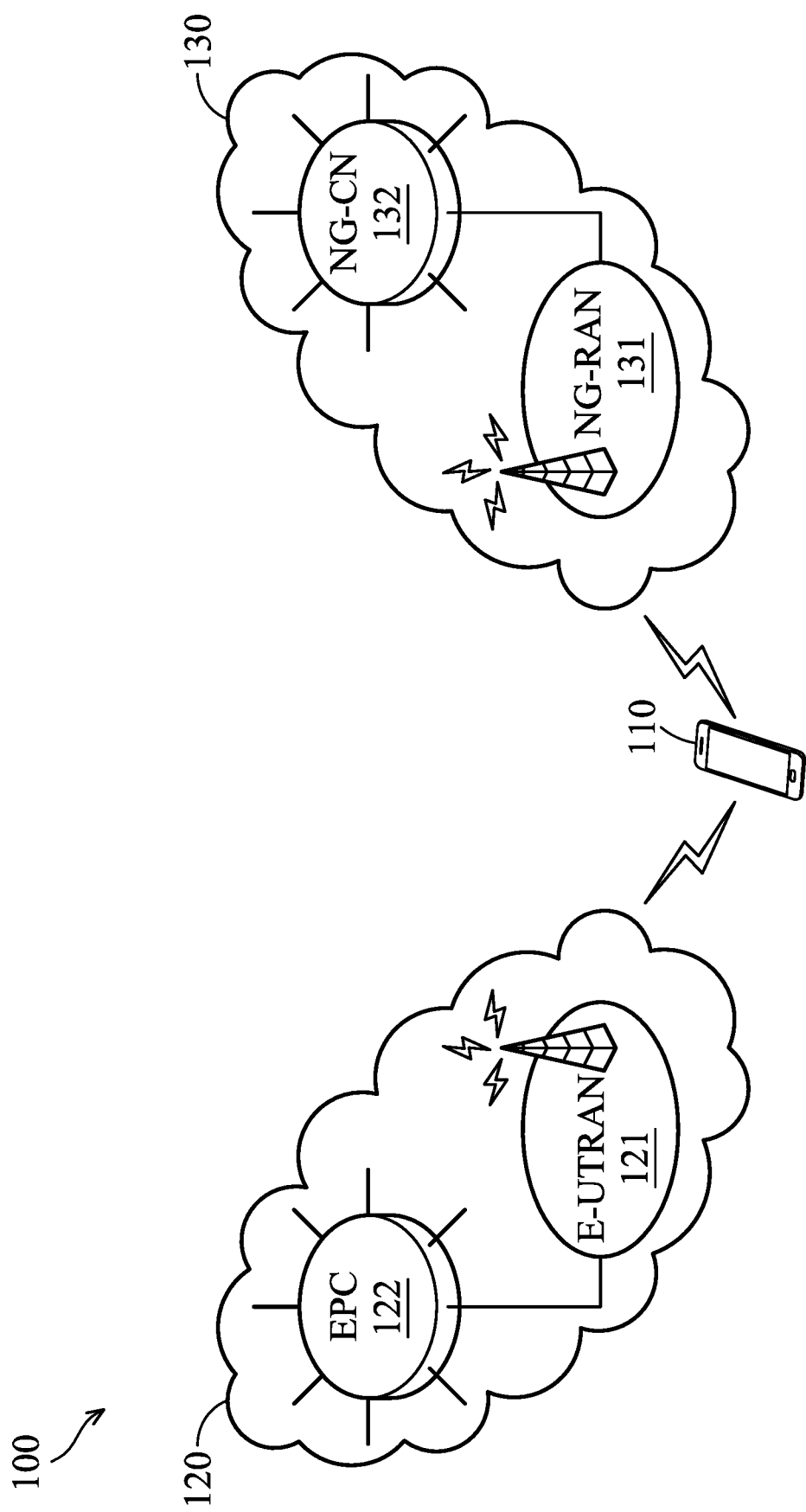
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a User Equipment (UE) 110, an LTE network 120, and a 5G NR network 130, wherein the UE 110 is wirelessly connected to one or both of the LTE network 120 and the 5G NR network 130.

In one embodiment, the UE 110 may have dual connectivity with the LTE network 120 and the 5G NR network 130 simultaneously, and this scenario is called Evolved-Universal Terrestrial Radio Access (E-UTRA)-NR Dual Connectivity (EN-DC).

The UE 110 may be a feature phone, a smartphone, a panel Personal Computer (PC), a laptop computer, or any wireless communication device supporting at least the cellular technologies utilized by the LTE network 120 and the 5G NR network 130.

The LTE network 120 may include an Evolved-Universal Terrestrial Radio Access Network (E-UTRAN) 121 and an Evolved Packet Core (EPC) 122. The E-UTRAN 121 is responsible for processing radio signals, terminating radio protocols, and connecting the UE 110 with the EPC 122, while the EPC 122 is responsible for performing mobility management, network-side authentication, and interfaces with a public/external data network (e.g., the Internet).

The E-UTRAN 121 may include one or more cellular stations, such as evolved NodeBs (eNBs) (including macro eNBs, femto eNBs, or pico eNBs), each of which may form a cell for providing mobile services to the UE 110. For example, the UE 110 may camp on one or more cells formed by one or more eNBs, wherein the cells which the UE 110 is camped on may be referred to as serving cells, including a Primary Cell (PCell) and/or one or more Secondary Cells (SCells).

The EPC 122 may include at least an MME, a Serving Gateway (S-GW), a Packet Data Network Gateway (P-GW), and a Home Subscriber Server (HSS).

The 5G NR network 130 may include a Next Generation Radio Access Network (NG-RAN) 131 and a Next Generation Core Network (NG-CN) 132. The NG-RAN 131 is responsible for processing radio signals, terminating radio protocols, and connecting the UE 110 with the NG-CN 132, while the NG-CN 132 is responsible for performing mobility management, network-side authentication, and interfaces with a public/external data network (e.g., the Internet).

The NG-RAN 131 may include one or more cellular stations, such as gNBs, which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110.

In case of EN-DC, the UE 110 may camp on one or more LTE cells formed by one or more eNBs, and simultaneously camp on one or more NR cells formed by one or more gNBs or TRPs, wherein the LTE cell(s) which the UE 110 is camped on may include a PCell and one or more SCells, and the NR cells which the UE 110 is camped on may include a Primary SCell (PSCell) and one or more SCells.

The NG-CN 132 generally consists of various network functions, including at least an AMF, a Session Management Function (SMF), a User Plane Function (UPF), a Policy Control Function (PCF), an Application Function (AF), and an Authentication Server Function (AUSF), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session.

The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

Although not shown, the LTE network 120 and the 5G NR network 130 may support interworking with specific communication interface(s). For example, there may be an N26 interface connecting the MME in the LTE network 120 and the AMF in the 5G NR network 130.

It should be understood that wireless communication environment 100 is for illustrative purposes only and is not intended to limit the scope of the application. For example, the application could be applied to other cellular technologies, such as a future enhancement of the 5G NR technology.

Figure 2:
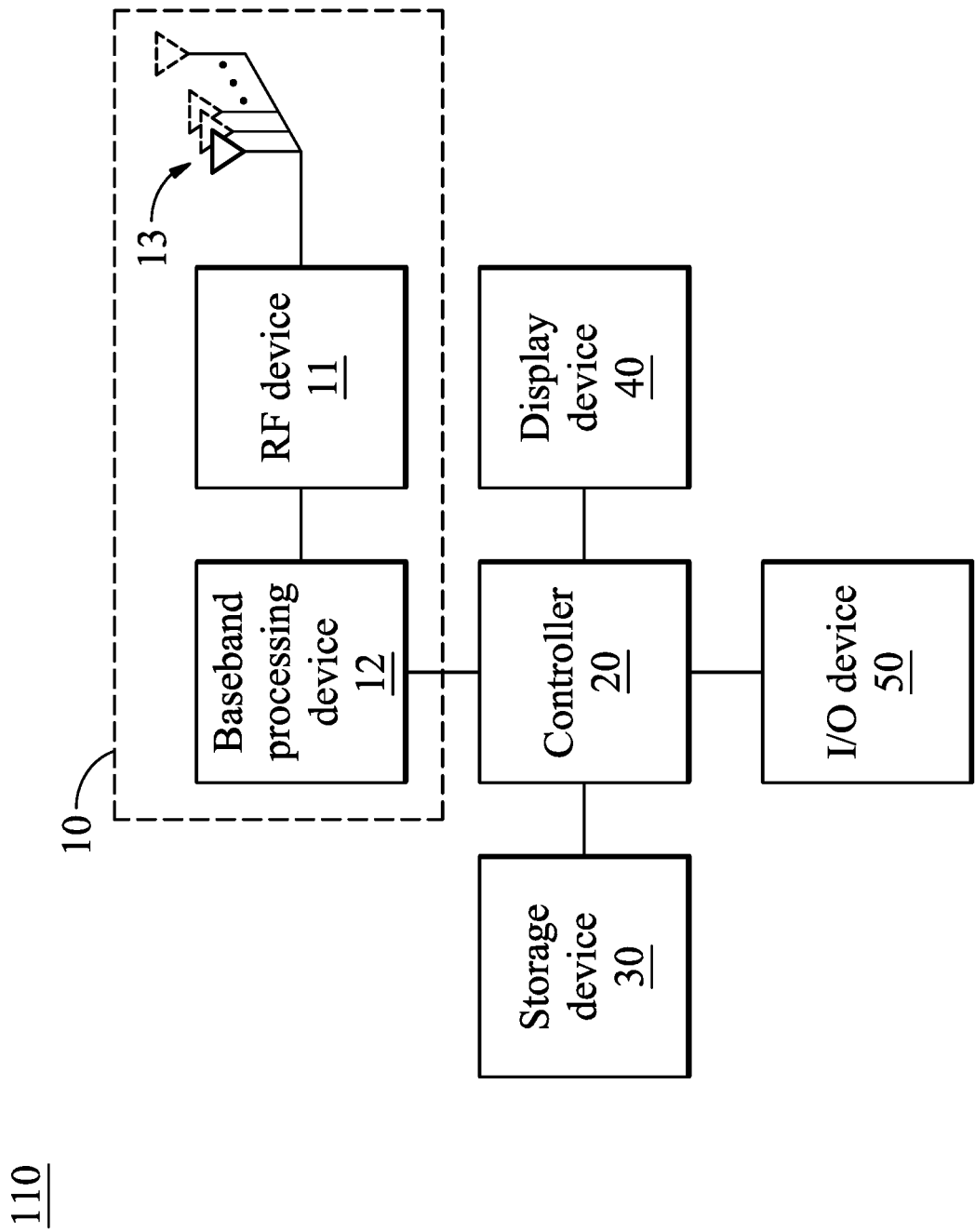
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the cells formed by the cellular stations of the E-UTRAN 121 and the NG-RAN 131. Specifically, the wireless transceiver 10 may include a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may contain a mixer to multiply the baseband signals with a carrier oscillated in the radio frequency of the supported cellular technologies, wherein the radio frequency may be any radio frequency (e.g., 30 GHz-300 GHz for mmWave) utilized in the 5G NR technology, or may be 900 MHz, 2100

MHz, or 2.6 GHz utilized in LTE/LTE-A/TD-LTE technology, or another radio frequency, depending on the cellular technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the cells formed by cellular station of the E-UTRAN 121 and/or the NG-RAN 131, storing and retrieving data (e.g., program code) to and from the storage device 30, sending a series of frame data (e.g. representing text messages, graphics, images, etc.) to the display device 40, and receiving signals from the I/O device 50.

In particular, the controller 20 coordinates the aforementioned operations of the wireless transceiver 10, the storage device 30, the display device 40, and the I/O device 50 for performing the method for extending the use of SFTD measurements.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., measurement results), instructions, and/or program code of applications, communication protocols, and/or the method for extending the use of SFTD measurements.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the UE 110 may include more components, such as a power supply, and/or a Global Positioning System (GPS) device, wherein the power supply may be a mobile/replaceable battery providing power to all the other components of the UE 110, and the GPS device may provide the location information of the UE 110 for use of some location-based services or applications. Alternatively, the UE 110 may include fewer components. For example, the UE 110 may not include the display device 40 and/or the I/O device 50.

Figure 3:
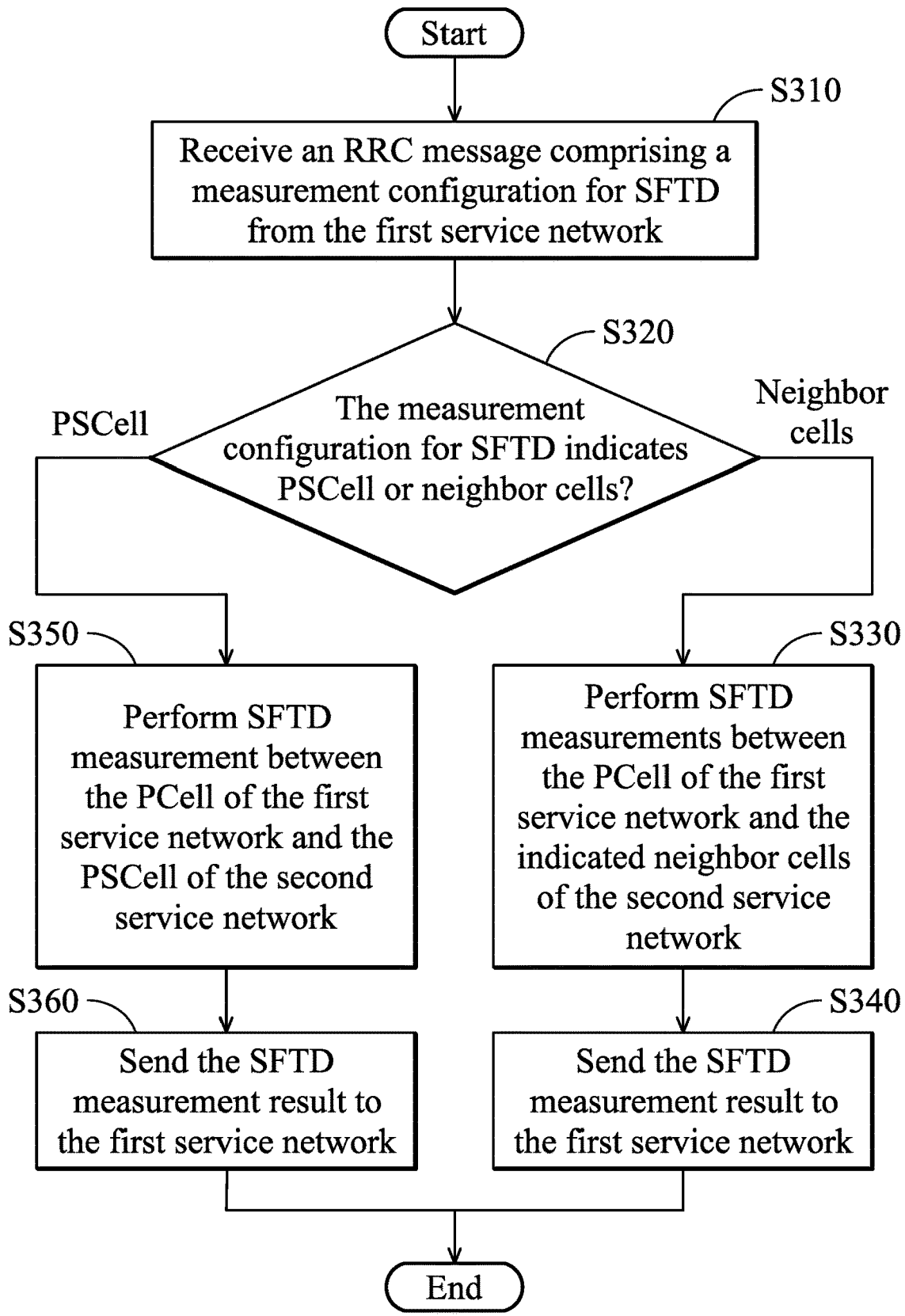
FIG. 3 is a flow chart illustrating the method for extending the use of SFTD measurements according to an embodiment of the application.

FIG. 3 is a flow chart illustrating the method for extending the use of SFTD measurements according to an embodiment of the application.

In this embodiment, the method for extending the use of SFTD measurements is executed by a UE (e.g., the UE 110) connected to a first service network (e.g., the LTE network 120) and a second service network (e.g., the 5G NR network).

To begin with, the UE receives a Radio Resource Control (RRC) message comprising a measurement configuration for SFTD from the first service network (step S310).

Specifically, the RRC message may be an RRC Connection Reconfiguration message or an RRC Connection Resume message.

Next, the UE determines whether the measurement configuration for SFTD indicates PSCell or neighbor cells (step S320).

The measurement configuration for SFTD may include at least a report configuration Information Element (IE) and a measurement object IE. The report configuration IE may further include a parameter "reportSFTD-Meas" which indicates the UE to perform SFTD measurement between the PCell and the PSCell of the second service network when it is set to "PSCell", or indicates the UE to perform SFTD measurements between the PCell and the neighbor cells (i.e., the NR cells not configured as PSCell) of the second service network when it is set to "neighborCells". The measurement object IE may include information indicating a carrier frequency that the indicated neighbor cells are on and a list of one or more Physical Cell Identities (PCIs) of the indicated cells (i.e., neighbor cells indicated by the parameter "reportSFTD-Meas") for SFTD measurements.

Subsequent to step S320, if the measurement configuration for SFTD indicates neighbor cells, the UE performs SFTD measurements between the PCell of the first service network and the indicated neighbor cells of the second service network (i.e., between the PCell and the NR cell(s) on the carrier frequency indicated in the measurement object of the measurement configuration for SFTD) (step S330), and sends the result of the SFTD measurements (or called the SFTD measurement result) to the first service network (step S340), and the method ends.

In one embodiment, the result of the SFTD measurements may include the information of only the cell with the best signal quality (e.g., Reference Signal Receiving Power (RSRP), Received Signal Strength Indicator (RSSI), Reference Signal Received Quality (RSRQ), or Signal to Interference Noise Ratio (SINR)) among the indicated neighbor cells, wherein the information may include the PCI of the cell, the SFN offset between the PCell and the cell, and the frame boundary offset between the PCell and the cell.

In another embodiment, the result of the SFTD measurements may include the information of the indicated neighbor cells with signal qualities (e.g., RSRP, RSSI, RSRQ, or SINR) greater than a predetermined threshold. For example, the SFTD measurement result may include a list of items, each of which may include a PCI of a respective one of the indicated neighbor cells, the SFN offset between the PCell and the respective one of the indicated neighbor cells, and the frame boundary offset between the PCell and the respective one of the indicated neighbor cells. Moreover, the items in the list may be sorted in decreasing order of cell signal qualities.

Subsequent to step S320, if the measurement configuration for SFTD indicates PSCell, the UE performs SFTD measurement between the PCell of the first service network and the PSCell of the second service network (step S350), and sends the result of the SFTD measurement to the first service network (step S360), and the method ends.

Specifically, the result of the SFTD measurement may include the PCI of the PSCell, the SFN offset between the PCell and the PSCell, and the frame boundary offset between the PCell and the PSCell.

In one embodiment, the SFTD measurement result may be sent in a Measurement Report message to the first service network.

In view of the forgoing embodiments, it will be appreciated that the present application realizes measurements and reports of the timing differences between the PSCell and the NR cell(s) that has/have not been configured as PSCell, by extend the use of SFTD measurements to the NR cell(s) that has/have not been configured as PSCell. Specifically, a new measurement configuration for SFTD is introduced in the existing RRC signaling, which is used to indicate whether the UE should perform SFTD measurement between the PCell and the PSCell or the NR cell(s) that has/have not been configured as PSCell.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
   a wireless transceiver, configured to perform wireless transmission and reception to and from a first service network and a second service network; and
   a controller, configured to:
      receive a Radio Resource Control (RRC) message comprising a measurement configuration for SFN (System Frame Number) and Frame Timing Difference (SFTD) from the first service network via the wireless transceiver, the measurement configuration for SFTD indicating plural indicated neighbor cells of the second service network that are not configured as Primary Secondary Cells (PSCells);
      perform first SFTD measurements between a Primary Cell (PCell) of the first service network and the indicated neighbor cells of the second service network via the wireless transceiver in response to the measurement configuration for SFTD indicating the UE to perform the first SFTD measurements between the PCell and the indicated neighbor cells; and
      send a result of the first SFTD measurements to the first service network via the wireless transceiver, the result of the first SFTD measurements reporting information regarding a portion of the indicated neighbor cells that meets a reporting criteria, the reporting criteria corresponding to a reported cell that is one of the indicated neighbor cells with best signal quality among the indicated neighbor cells, or regarding the portion of the indicated neighbor cells with signal qualities greater than a predetermined threshold.

2. The UE of claim 1, wherein the measurement configuration for SFTD comprises
   a report configuration indicating the indicated neighbor cells, and
   measurement object information indicating a carrier frequency that the indicated neighbor cells are on and a list of one or more PCIs of the indicated neighbor cells.

3. The UE of claim 1, wherein the controller is further configured to
   perform a second SFTD measurement between the PCell and a PSCell of the second service network via the wireless transceiver in response to the measurement configuration for SFTD indicating the PSCell, and
   send a result of the second SFTD measurement to the first service network via the wireless transceiver.

4. The UE of claim 3, wherein the measurement configuration for SFTD comprises a report configuration indicating the PSCell.

5. The UE of claim 1, wherein the result of the first SFTD measurements comprises a PCI of the reported cell with the best signal quality among the indicated neighbor cells, an SFN offset between the PCell and the reported cell, and a frame boundary off set between the PCell and the reported cell.

6. The UE of claim 1, wherein the result of the first SFTD measurements comprises a list of items including the portion of the indicated neighbor cells, each of which comprises a PCI of a corresponding one of the indicated neighbor cells, an SFN offset between the PCell and the corresponding one of the indicated neighbor cells, and a frame boundary offset between the PCell and the corresponding one of the indicated neighbor cells.

7. The UE of claim 6, wherein the list of items includes listed neighbor cells sorted in a decreasing order of the signal qualities of the listed neighbor cells.

8. A method for extending use of SFN (System Frame Number) and Frame Timing Difference (SFTD) measurements, executed by a UE connected to a first service network and a second service network, comprising:
   receiving a Radio Resource Control (RRC) message comprising a measurement configuration for SFTD from the first service network, the measurement configuration for SFTD indicating plural indicated neighbor cells of the second service network that are not configured as Primary Secondary Cells (PSCells);
   performing first SFTD measurements between a Primary Cell (PCell) of the first service network and the indicated neighbor cells of the second service network in response to the measurement configuration for SFTD indicating the UE to perform the first SFTD measurements between the PCell and the indicated neighbor cells; and
   sending a result of the first SFTD measurements to the first service network, the result of the first SFTD measurements reporting information regarding a portion of the indicated neighbor cells that meets a reporting criteria, the reporting criteria corresponding to a reported cell that is one of the indicated neighbor cells with best signal quality among the indicated neighbor cells, or regarding the portion of the indicated neighbor cells with signal qualities greater than a predetermined threshold.

9. The method of claim 8, wherein the measurement configuration for SFTD comprises
a report configuration indicating the indicated neighbor cells, and
measurement object information indicating a carrier frequency that the indicated neighbor cells are on and a list of one or more PCIs of the indicated neighbor cells.

10. The method of claim 8, further comprising:
performing a second SFTD measurement between the PCell and a PSCell of the second service network in response to the measurement configuration for SFTD indicating the PSCell; and
sending a result of the second SFTD measurement to the first service network.

11. The method of claim 10, wherein the measurement configuration for SFTD comprises a report configuration indicating the PSCell.

12. The method of claim 8, wherein the result of the first SFTD measurements comprises a PCI of the reported cell with the best signal quality among the indicated neighbor cells, an SFN offset between the PCell and the reported cell, and a frame boundary offset between the PCell and the reported cell.

13. The method of claim 8, wherein the result of the first SFTD measurements comprises a list of items including the portion of the indicated neighbor cells each of which comprises a PCI of a corresponding one of the indicated neighbor cells, an SFN offset between the PCell and the corresponding one of the indicated neighbor cells, and a frame boundary offset between the PCell and the corresponding one of the indicated neighbor cells.

14. The method of claim 13, wherein the list of items includes listed neighbor cells sorted in a decreasing order of the signal qualities of the listed neighbor cells.

15. A non-transitory computer-readable storage medium storing instructions, which when being executed by a processor of a UE communicatively connected to a first service network and a second service network cause the UE to perform a method for extending use of SFN (System Frame Number) and Frame Timing Difference (SFTD) measurements, and the method comprising:
receiving a Radio Resource Control (RRC) message comprising a measurement configuration for SFTD from the first service network, the measurement configuration for SFTD indicating plural indicated neighbor cells of the second service network that are not configured as Primary Secondary Cells (PSCells);
performing first SFTD measurements between a Primary Cell (PCell) of the first service network and the indicated neighbor cells of the second service network in response to the measurement configuration for SFTD indicating the UE to perform the first SFTD measurements between the PCell and the indicated neighbor cells; and
sending a result of the first SFTD measurements to the first service network, the result of the first SFTD measurements reporting information regarding a portion of the indicated neighbor cells that meets a reporting criteria, the reporting criteria corresponding to a reported cell that is one of the indicated neighbor cells with best signal quality among the indicated neighbor cells, or regarding the portion of the indicated neighbor cells with signal qualities greater than a predetermined threshold.

* * * * *